US009493370B2

(12) United States Patent
Mitzlaff et al.

(10) Patent No.: US 9,493,370 B2
(45) Date of Patent: *Nov. 15, 2016

(54) WASTEWATER TREATMENT SYSTEM (75) Inventors: Theodore K. Mitzlaff, Louisville, KY (US); Jesse C. Fletcher, Decatur, AL (US)

(73) Assignee: RELIANCE AUTOMATION, LLC, Decatur, AL (US)

(*) Notice: Subject to any disclaimer, the term of this patent is extended or adjusted under 35 U.S.C. 154(b) by 914 days.

This patent is subject to a terminal disclaimer.

(21) Appl. No.: 13/192,133

(22) Filed: Jul. 27, 2011

(65) Prior Publication Data
US 2012/0000859 A1    Jan. 5, 2012

Related U.S. Application Data (63) Continuation-in-part of application No. 12/397,058, filed on Mar. 3, 2009, now Pat. No. 8,262,914.

(51) Int. Cl.
C02F 1/52       (2006.01)
C02F 1/56       (2006.01)
C02F 1/24       (2006.01)
C02F 101/32     (2006.01)

(52) U.S. Cl.
CPC ............. *C02F 1/5209* (2013.01); *C02F 1/56* (2013.01); *C02F 1/24* (2013.01); *C02F 2101/32* (2013.01); *C02F 2101/325* (2013.01); *C02F 2209/001* (2013.01); *C02F 2209/003* (2013.01); *C02F 2209/005* (2013.01); *C02F 2209/06* (2013.01); *C02F 2209/08* (2013.01); *C02F 2209/10* (2013.01); *C02F 2209/11* (2013.01); *C02F 2209/40* (2013.01); *C02F 2303/24* (2013.01)

(58) Field of Classification Search
None
See application file for complete search history.

(56) References Cited

U.S. PATENT DOCUMENTS

| | | | |
|---|---|---|---|
| 3,605,775 A | 9/1971 | Zaander et al. | |
| 3,723,712 A | 3/1973 | Komline et al. | |
| 4,348,112 A * | 9/1982 | Moreaud et al. | 356/338 |
| 4,784,764 A * | 11/1988 | Kleinschnittger et al. | 210/96.1 |
| 4,855,061 A | 8/1989 | Martin | |
| 5,160,439 A | 11/1992 | Dobrez et al. | |
| 2008/0047903 A1 | 2/2008 | Morse | |
| 2009/0107915 A1 | 4/2009 | Skinner et al. | |
| 2009/0120881 A1* | 5/2009 | Fanday | 210/725 |

OTHER PUBLICATIONS

Derwent-Acc-No. 2003-705750—KR 2003044448 A Jun. 9, 2003.*
Colic et al, "New developments in mixing, flocculation and floatation for industrial wastewater pretreatment and municipal wastewater treatment", Clean Water Technology Inc., 2005.*

* cited by examiner

*Primary Examiner* — Krishnan S Menon
(74) *Attorney, Agent, or Firm* — Middleton Reutlinger; Alexander P. Brackett (57) ABSTRACT

The present invention is a system and method for treating a wastewater stream to produce an effluent having an acceptable level of turbidity. The invention comprises a controller operatively coupled to at least one turbidity meter for monitoring turbidity of the effluent stream. A plurality of chemical treatment additive pumps are provided for providing a plurality of additives to the wastewater stream. Furthermore, a method of sequentially testing the amount of each additive required to produce an effluent stream having an acceptable turbidity is disclosed.

6 Claims, 6 Drawing Sheets

WASTEWATER TREATMENT SYSTEM

CROSS-REFERENCE TO RELATED APPLICATIONS

This application is a continuation-in-part of U.S. patent application Ser. No. 12/397,058 entitled "Automated Wastewater Treatment System", filed Mar. 3, 2009.

BACKGROUND OF THE INVENTION

1. Field of the Invention

The present invention relates generally to a system and method of treating wastewater to produce a chemically acceptable effluent stream and more particularly to an automated system and method for treating wastewater that controls contaminant levels of a plurality of contaminants present in the wastewater while simultaneously minimizing chemical treatment costs and monetary fines imposed due to the release of substandard effluent into a municipal sewage system.

2. Description of the Related Art

The treatment of industrial wastewater is a necessary and difficult task common to most, if not all manufacturing facilities. A vast array of contaminants that are byproducts of manufacturing processes may be removed from the process by a wastewater stream. Accordingly, this wastewater stream carries contaminants in the form of suspended solids that range widely in size, as well as an assortment of liquids-oils, surfactants, polymers, acids, fats, blood, process ingredients, metal salts, total suspended solids (TSS), biological oxygen demand (BOD), chemical oxygen demand (COD) and the like. It is therefore necessary—in fact required—to remove and/or neutralize these contaminants to maintain an effluent stream that meets the minimum standards of wastewater sewage for a given locale prior to releasing the effluent into a sewage system.

As an added incentive, many municipalities levy fines for the discharge of effluents that do not meet their minimum standards, thereby potentially greatly increasing the cost of doing business. This problem is particularly acute where an effluent stream is highly variable, since it is difficult to maintain effluent stream contamination standards when the incoming wastewater stream varies greatly in its contaminant levels.

A variety of prior art systems for wastewater treatment employing various technical approaches have attempted to solve these problems. Systems employing tanks and weirs for separation of contaminants from liquids through sedimentation have been in widespread use. Sedimentation in holding tanks is often accompanied by utilizing filtration systems such as filters or screens to remove small solid particles in the effluent stream. However, filtration systems require a great deal of maintenance and are subject to clogging or partial clogging, thereby impeding flow through a system.

Dissolved air flotation systems (DAF's) have been employed with some degree of success wherein air bubbles are introduced at a lower portion of a dissolved it flotation tank to carry particles suspended in the liquid to the surface thereof. The solids at the surface aggregate together, either naturally or through the use of coagulant additives, thereby permitting removal of at least a portion of the solids in the wastewater. Effluent is then drawn from a lower portion of the DAF system. Furthermore, a variety of flotation systems are used where the solids being removed have densities close to that of water.

DAF systems vary widely in the time required to process a given wastewater stream depending upon the flow rate, contaminant levels, residence time of air bubbles in the DAF tank, the turbulence of the liquid stream being introduced to the DAF tank, DAF tank size, and the presence of more than one wastewater stream entering a tank. Due to the unpredictable nature of these variables there may be a considerable time lag between introduction of treatment chemicals into the wastewater stream and acceptable effluent contamination levels at the outlet of the DAF. This difficulty is further enhanced by widely varying contaminant levels in wastewater streams.

Many wastewater solids may include charged particles-oils, greases, fats, and other emulsified particles. Treatment of these types of contaminants often includes the use of coagulant and flocculant chemical additives to produce colloidal particles, termed "flocs" which can then be skimmed and removed. However, the use of coagulants and flocculants for neutralizing these contaminants must be carefully monitored because in too great a quantity, the flocs tend to break apart as they once again acquire a charge. In this situation, the wastewater treatment chemicals have been utterly wasted, and the wastewater must be re-treated before release into an effluent stream or be discharged as non-compliant wastewater.

Additionally, in many wastewater systems the pH of the wastewater stream must be modified to an acceptable level by the addition of cationic or anionic chemicals into the wastewater stream, and frequent testing of pH levels of the effluent to maintain proper pH balance.

In order to properly balance the chemical additives required to treat a contaminated wastewater stream, plant operators typically conduct "jar" tests wherein a plurality of jars or containers are filled from the wastewater stream, and each is treated with a differing chemical additive, or alternatively a combination of chemical additives, in differing amounts. When multiple additives such as coagulants and polymers are required to treat the wastewater, a plurality of jar tests are required to test various combinations of additive amounts to determine which combination results in an effluent that is acceptable for discharge from the system.

The requisite amount of chemical additives necessary to treat the wastewater are then recorded, and the flow rate of each additive must then be calculated based upon the rate of flow of wastewater into the treatment system. Once the proper flow rates are established the chemical additives are typically supplied to the system by pumps, which must be set to deliver the proper additive flows.

One great difficulty of this system of wastewater treatment is that if the wastewater input stream changes appreciably, the additives must be readjusted, thereby requiring additional jar tests. Additionally, a change in wastewater stream flow requires the pumps to be adjusted, since the proportion of additives must be adjusted proportionally to the wastewater stream flow. Furthermore, in many manufacturing environments it is impractical to train personnel to monitor the effluent stream, conduct periodic and frequent jar tests, calculate additive flow rates, make pump adjustments, and carefully monitor incoming stream flow rates in order to maintain the treatment system's operation.

Accordingly, there is a need for an automated wastewater treatment system that is capable of monitoring an effluent stream for out of range contaminant levels, conducting jar tests, and adjusting additive flow rates accordingly.

SUMMARY OF THE INVENTION

The present invention obviates the aforementioned problems inherent in the prior art by providing a system and method of wastewater treatment that produces an effluent stream within an acceptable turbidity range without the need for costly and time-consuming manual "jar" tests typically practiced in the art.

Specifically, the invention utilizes a controller, for example an industrial controller having a microprocessor, data memory, and a plurality of inputs and outputs that interface with various system components as set forth in greater detail below. The controller is operatively coupled to a turbidity meter, or a plurality thereof, that provides a signal representative of turbidity at a point or points in the effluent stream for determining whether the effluent stream is within an acceptable turbidity.

A plurality of pumps is provided for supplying a plurality of chemical additives to the wastewater stream to control the turbidity thereof. Each pump is operatively coupled to the controller whereby the controller supplies a plurality of flow rate set point signals to initiate and conduct a jar test to determine the proper balance of additives supplied to the wastewater stream to produce the best turbidity reading.

Other features, objects and advantages of the present invention will become apparent from the detailed description of the preferred embodiments appended herein below and taken in conjunction with the attached drawing Figures.

DETAILED DESCRIPTION OF THE PREFERRED EMBODIMENT(S)

Referring now to the drawing Figures, and in accordance with a one embodiment of the present invention a system 10 and method of treating a wastewater stream 1 to produce an effluent stream 2 having a contaminant concentration below a predetermined threshold comprises a wastewater treatment facility 20 having a storage or dissolved air filtration tank (DAF) 30, a wastewater inlet 40 for providing contaminated wastewater to tank 30, and an effluent outlet 50 for withdrawing treated wastewater 1 from tank 30. Furthermore, a plurality of floc (or flocculant) tubes 60 may be provided between inlet 40 and tank 30 to mix wastewater 1 with treatment chemicals prior to its introduction into tank 30.

Tank 30 may comprise a dissolved air flotation device (hereinafter DAF) for introducing air bubbles into wastewater 1 thereby aiding in separation and flotation of coagulated solids to the surface of tank 30. It should be noted that throughout this specification for purposes of clear explication the present invention will be described in the context of operation within a DAF wastewater treatment facility. However, the present invention may be practiced in conjunction with a broad spectrum of wastewater filtration systems such as sedimentation systems, clarifiers, separators, equalization tanks and the like, without departing from the scope of the invention.

System 10 further comprises a controller 100 having a microprocessor 102, or a plurality thereof, and concomitant data memory 104 for storing process variables. Controller 100 further comprises a plurality of inputs 110 for accepting electrical signals from system 10 components and a plurality of outputs 112 for supplying signals to system 10 components. Additionally, an operator interface 120 may be operatively coupled to controller 100 to enable a user to monitor and control system operation as discussed further herein below. Controller 100 may comprise one of many commercially available controllers including but not limited to programmable logic controllers (PLC's) having configurable input and output cards, distributed logic controllers, personal computers or proprietary microprocessors having the requisite inputs and outputs to control system 10. Furthermore, operator interface 120 may comprise one of many commercially available operator interfaces utilizing video displays, touch screens, keyboards and the like to permit user control of system 10.

Figure 2:
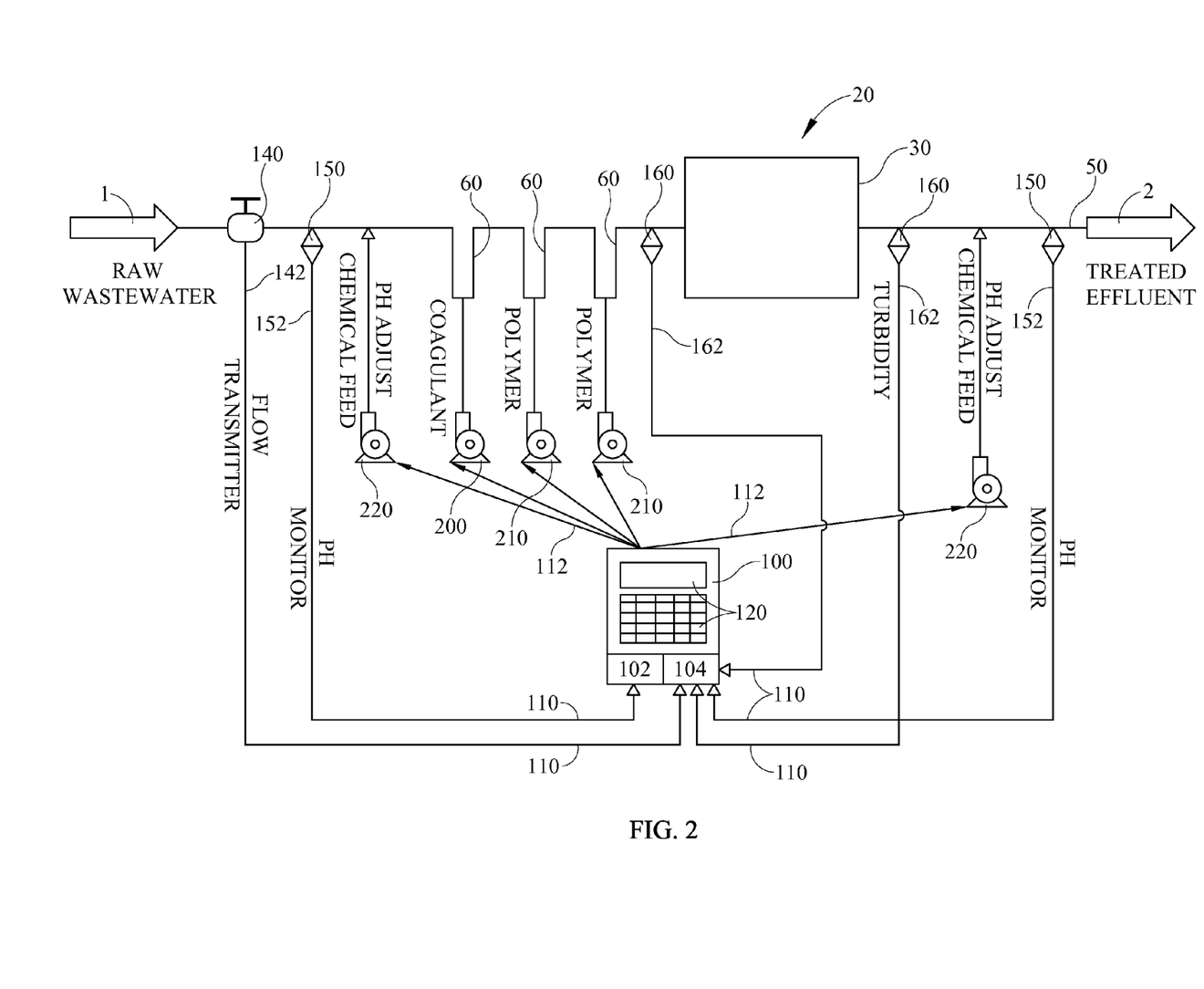
FIG. 2 is a block diagram of a wastewater control system in accordance with one embodiment of the present invention.

System 10 further includes a flow meter 140 disposed in the wastewater inlet 40 line, capable of measuring the flow rate of wastewater through inlet 40. Flow meter 140 may comprise a flow output signal 142 representative of wastewater flow operatively coupled to an input 110 of controller 100 whereby controller 100 is capable of monitoring the flow rate of wastewater entering system 10. As shown in FIG. 2 a pH meter 150 may be provided proximate inlet 40 having an output 152 representative of the pH of the wastewater stream prior to treatment, which output 152 is operatively coupled to an input 110 of controller 100. Additionally, a pH meter 150 may be disposed proximate effluent outlet 50 such that controller 100 may monitor pH in the effluent stream.

Figure 1:
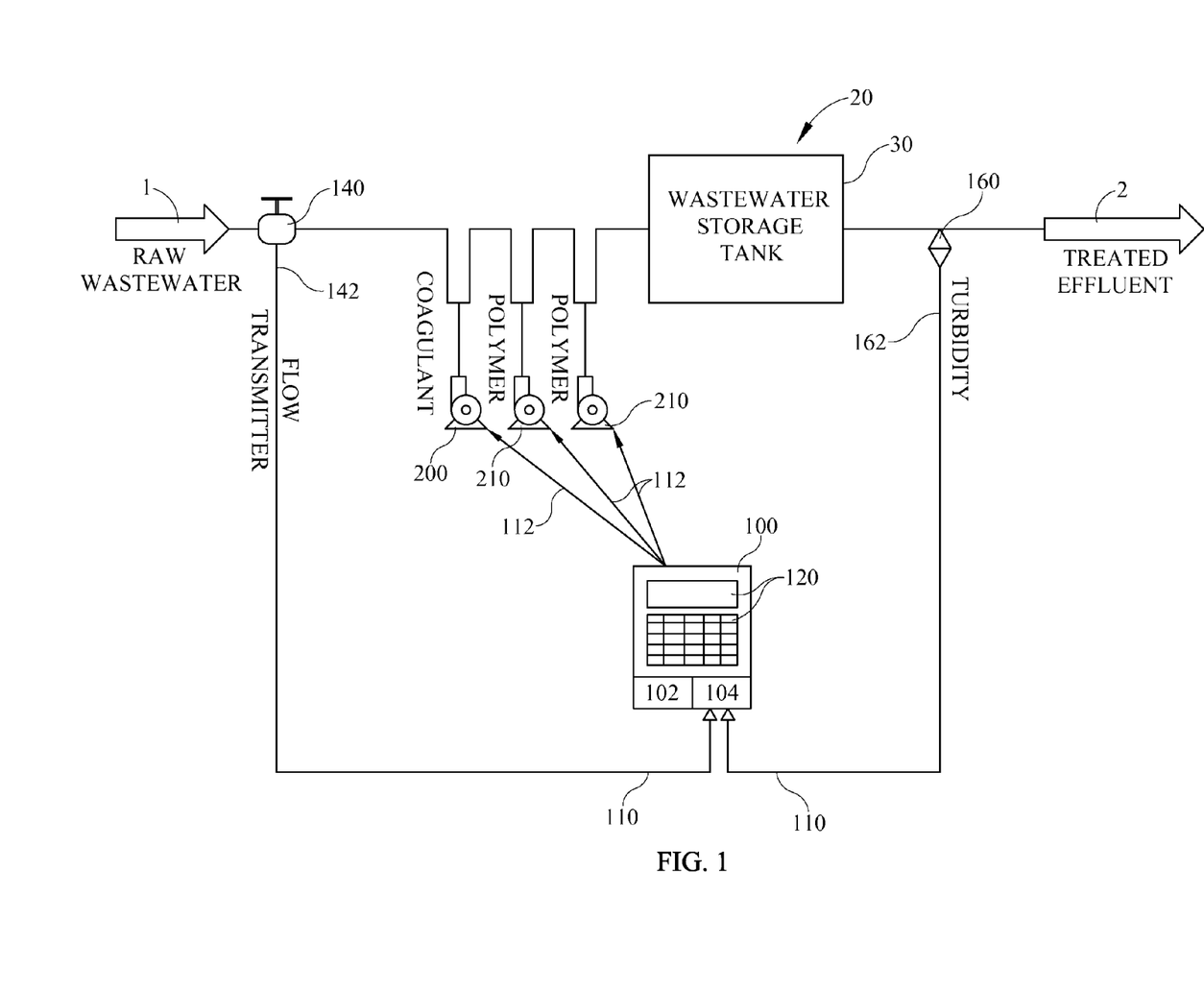
FIG. 1 is a block diagram of a wastewater control system in accordance with one embodiment of the present invention.

As best seen in FIGS. 1 and 2 a turbidity meter 160 is provided in fluid communication with effluent outlet 50 for measuring the clarity of treated wastewater effluent. Turbidity meter 160 comprises an output 162 representative of turbidity as measured by any one of several standards, including Nephelopmetric Turbidity Units (NTU) or Jackson Turbidity Units (JTU) operatively coupled to an input 110 of controller 100. For purposes of explication only the specification will refer to the measure of turbidity in NTU's. FIG. 2 depicts an alternative embodiment of the present invention wherein a second turbidity meter 160 is provided in the wastewater stream 1 at a point downstream of floc tubes 60 but upstream of entry into tank 30 for monitoring the turbidity of wastewater 1 that has been treated in floc tubes 60, as will be discussed in greater detail herein below.

System 10 further comprises a plurality of additive pumps for supplying metered quantities of chemical additives to wastewater stream 1. FIG. 1 depicts system 10 having three additive pumps: a coagulant pump 200, and a pair of polymer pumps 210. Each pump is in fluid communication with wastewater stream 1 proximate inlet 40 and floc tubes 60, upstream of turbidity meter 160 whereby a metered flow of coagulant and polymers may be supplied to wastewater stream 1. Pumps 200 and 210 are operatively coupled to outputs 112 of controller 100, which provide an electrical signal representative of a desired additive flow rate to pumps 200 and 210, whereby controller 100 may meter chemical additives being supplied to system 10 based upon desired effluent turbidity or other contaminant measures. In one embodiment of the present invention pumps 200 and 210 may comprise positive displacement pumps or other commercially available pumps capable of accurately metering fluid from a storage tank (not shown) to system 10. Pumps 200 and 210 may be operated by providing an output 112 to a variable frequency drive which in turn varies the rotational speed of the shaft of an electric motor used to power pumps 200, 210, as is known in the art. Alternatively, various metering pumps capable of delivering measured fluid volumes may be employed without departing from the scope of the invention.

Typically, coagulant pump 200 may deliver a coagulant to system 10 floc tubes 60 (or any other convenient point for chemical constituent injection) such as aluminum sulfate, aluminum chlorohydrate, ferric chloride, ferric sulfate, polyamine, poly-DADMAC, polyaluminum chlorohydrate, or any one of a wide variety of commercially available coagulants. Similarly, polymer pumps 210 may deliver cationic and anionic solutions at varying concentrations to floc tubes 60, thereby permitting mixing of wastewater stream 1 and chemical additives as stream 1 passes through floc tubes 60 into tank 30.

Additionally, a pH pump 220, or a plurality thereof, may be provided for delivery of an alkaline or basic solution, or both, to balance the pH of the wastewater stream. As best seen in FIG. 2, a pair of pH pumps 220 may be provided, one at a point in wastewater stream 1 prior to floc tubes 60, and one at a point downstream of tank 30 whereby pH can be adjusted both prior to and subsequent to treatment of wastewater stream 1.

It should be noted that while the description of the invention refers consistently to both turbidity and pH as control variables for wastewater treatment, a wide variety of contaminant control variables may be used in place of turbidity or pH without departing from the scope of the instant invention. For example, wastewater stream 1 may be monitored for the presence of heavy metals or pH (alkalinity) and appropriate corrective additives may be metered to wastewater stream 1 through additive pumps 200 in accordance with the system 10 and method of the invention.

Figure 3:
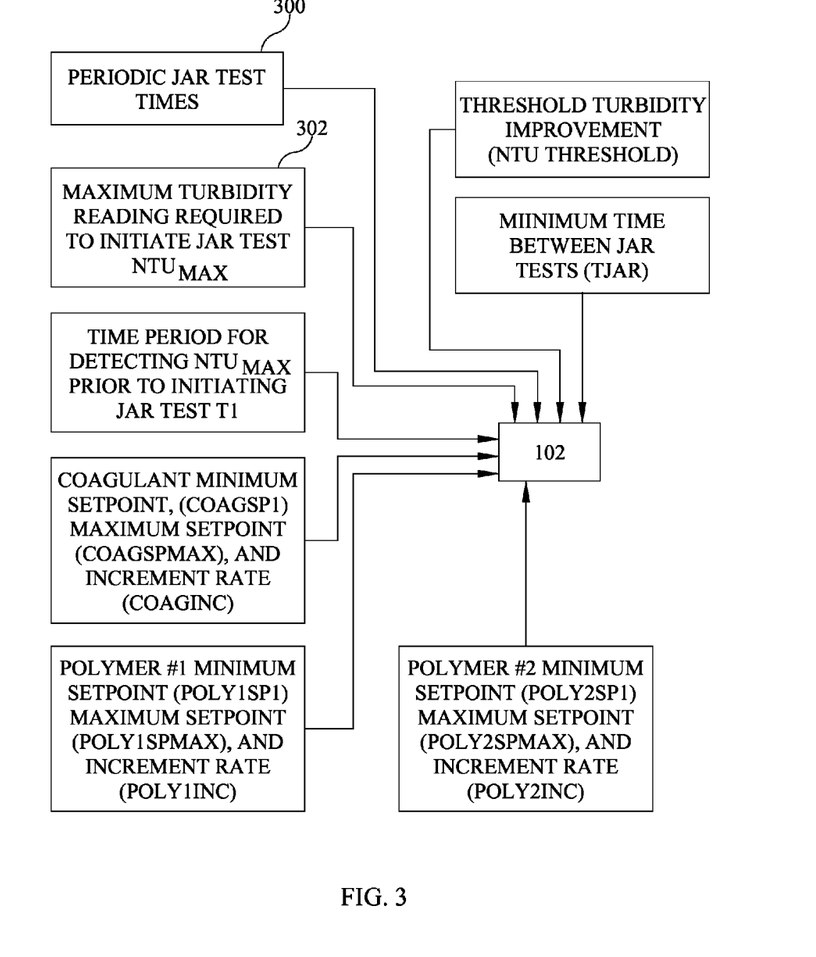
FIG. 3 is a plurality of user adjustable system parameters that may be stored in data memory in accordance with one embodiment of the present invention.

Referring now to FIG. 3, a plurality of system 10 parameters are shown that may be input to controller 100 and stored in data memory 102 to customize system 10 operation for a wide variety of wastewater treatment applications. Parameters that may be set by an operator include a plurality of times at which jar test may be automatically initiated, a maximum turbidity level (NTUmax) that, when detected by turbidity meter 160, will initiate a jar test, a time period (T1) for which NTUmax must be present prior to initiating a jar test, a minimum set point for coagulant flow (COAGSP1), a maximum set point for coagulant flow (COAGSPMAX) and a flow increment rate for coagulant (COAGINC). Additionally, analogous parameters may be set for each additional additive used in system 10.

For purpose of example only, FIGS. 3 and 4 assume the use of a single coagulant additive and a pair of polymer additives. Accordingly, the following parameters may be entered into controller 100 by an operator for each of polymer #1 and polymer #2 respectively: polymer minimum flow rate set points (POLY1SP1, POLY2SP1), polymer maximum flow rate set points (POLY1SPMAX, POLY2SPMAX) and a flow increment rate for each polymer (POLY1INC, POLY2INC). It should be noted that the flow rates set by an operator may be specified as, for example, a parts per million (ppm) flow rate. These flow rate settings may then be scaled by controller 100 to provide an output to pumps 200, 210, and 220 that is representative of the number of parts per million selected based upon the flow rate of the wastewater entering system 10, as read by flow transmitter 140. By specifying these parameters and operator can achieve a jar test utilizing the system and method of the invention that is far superior to conventional jar tests, as will be detailed herein below.

As one example or parameters that may be provided via operator interface 120, 100 percent coagulant solution may be provided at a minimum flow rate set point (COAGSP1) of 50 parts per million (ppm), a maximum (COAGMAX) of 100 ppm, and an increment (COAGINC) of 10 ppm. Similalry, 0.05% anionic polymer #1 solution may be provided at a minimum flow rate set point (POLY1SP1) of 8 ppm, a maximum (POLY1MAX) of 18 ppm, and an increment (POLY1INC) of 2 ppm. Finally, a 0.05% cationic polymer #2 solution may be provided at a minimum flow rate set point (POLY2SP1) of 8 ppm, a maximum (POLY2MAX) of 26 ppm, and an increment (POLY1INC) of 2 ppm. It will be understood that the above parameters are for purposes of explication and example only, and are in no way to be construed as limiting of the invention.

Figure 4A:
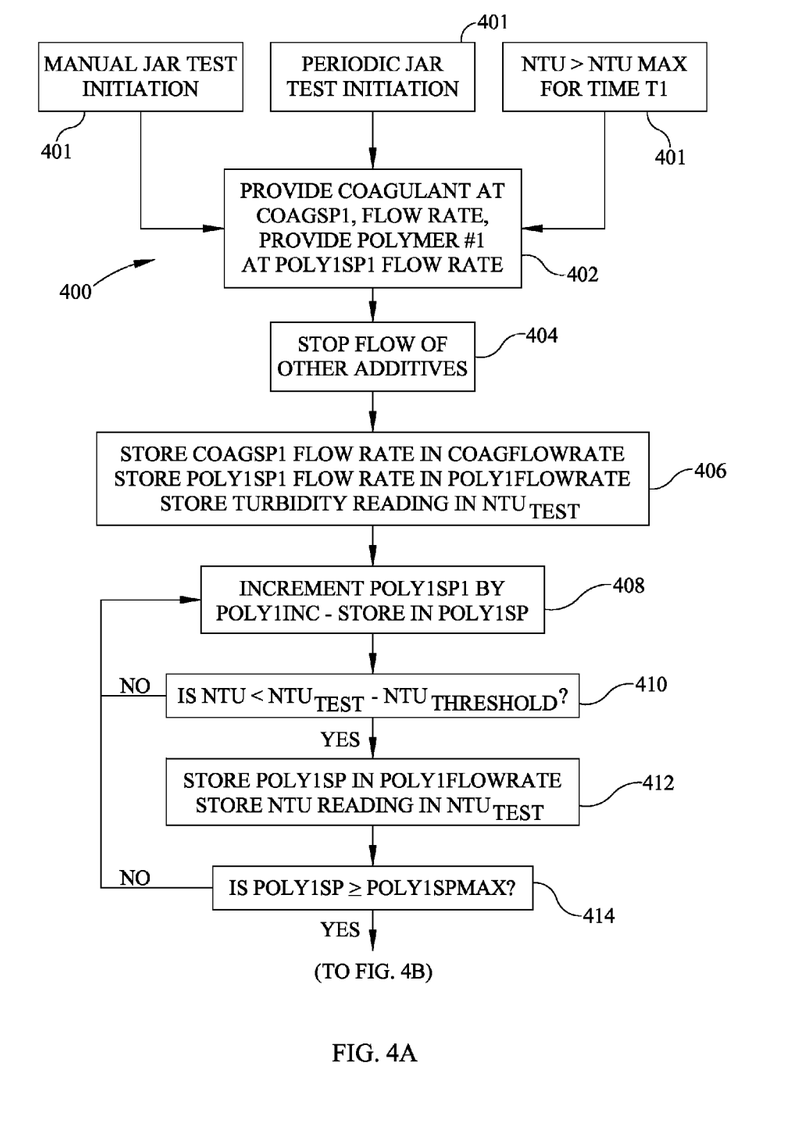
FIGS. 4A-4C are exemplary flow charts of system operation in accordance with one embodiment of the present invention.
Figure 4B:
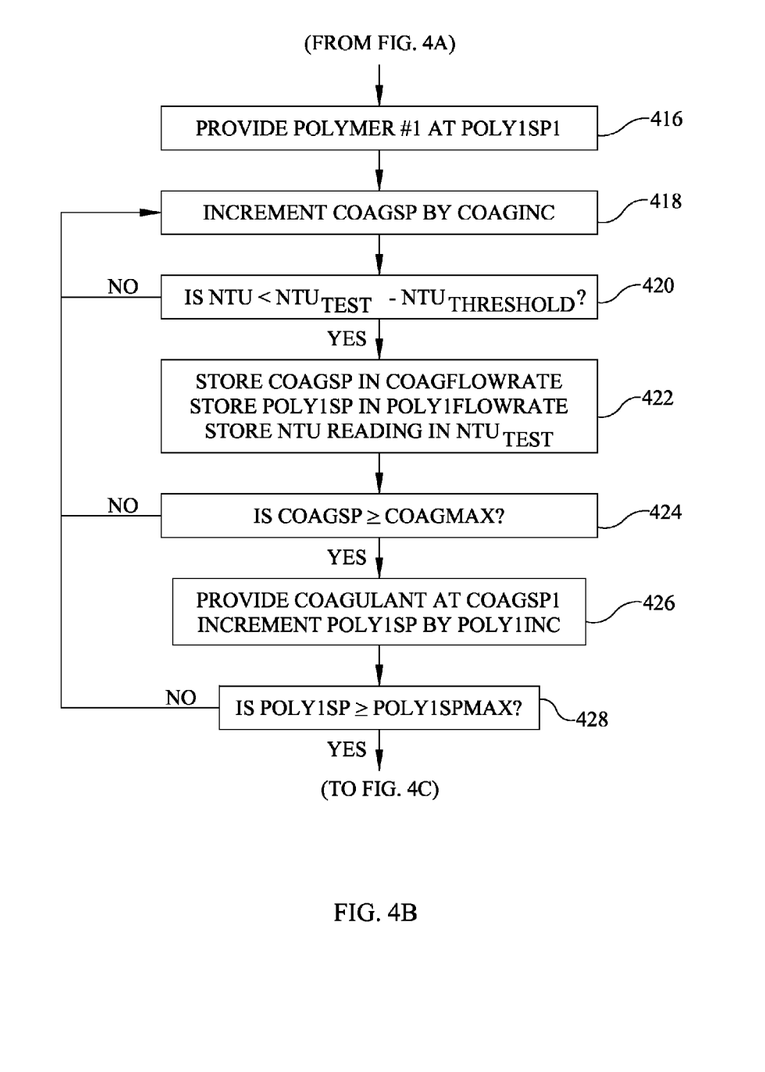
Figure 4C:
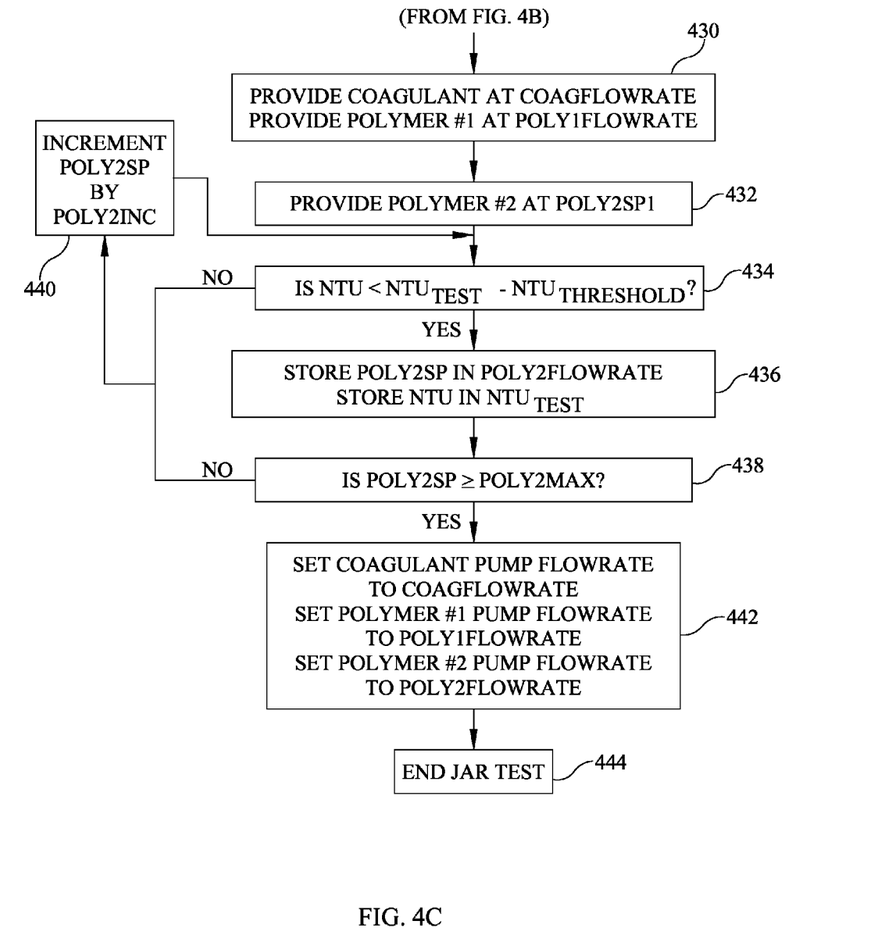

Referring now to FIGS. 4A-4C, wastewater stream 1 may be efficaciously treated by system 10 by conducting the following system 10 operations. The initiation and conduct of a jar test for coagulant additive flow rates is depicted in FIGS. 4A-4C, shown as process 400. The steps in the processes described herein are conducted primarily through the application of programming instructions run in controller 100, responsive to measured process variables supplied to controller 100 through its inputs 110 and operator interface 120.

Initially, at all times flow meter 140 provides flow signal 142 to controller 100 to enable controller 100 to continuously adjust the additive supply rates of pumps 200, 210, and 200 to the current additive rates adjusted for the flow rate of wastewater stream 1. As one example, if wastewater stream flow rate 1 increases ten percent, the flow rate set points of pumps 200, 210 and 200 would likewise each increase ten percent to accommodate the increased volume of wastewater. Thus each pump 200, 210 and 220 supplies its respective additive to system 10 at predetermined set point that is adjusted for wastewater flow rate by supplying appropriate outputs 112 to the pumps. For purposes of example, the flow rate set point of coagulant pump 200 may be stored in a data register in controller 100 given the place name "COAGSP". Similarly, polymer #1 and polymer #2 pumps 210 may have flow rate set point registers such as "POLY1SP" and POLY2SP" respectively. While these flow rate set points will be referred to throughout the specification, they may be replaced with any convenient terminology and are not limiting of the system and method of the invention described herein.

Turbidity is likewise continuously monitored, either by a single turbidity meter 160 in the effluent stream 2 as shown in FIG. 1, or alternatively by a pair of turbidity meters 160, one in the effluent stream 2 and one disposed between floc tubes 60 and tank 30. Initially, controller 100 is supplied with a predetermined turbidity threshold, NTU max, which is input through operator interface 120. When the turbidity as measured by turbidity meter 160 proximate effluent stream 2 exceeds NTU max for a predetermined time period T1, the jar testing process is initiated, as shown in step 401. Both NTU max and T1 may be adjusted by an operator, by inputting appropriate values through use of operator interface 120. Additionally, the jar test can also be performed at predetermined time intervals set by an operator through operator interface 120, or by a manual initiation through operator interface 120.

Once the jar test process is initiated, controller 100 provides an initial coagulant pump flow rate set point (COAGSP1) as an output 110 to coagulant pump 200 and also provides polymer #1 at an initial pump flow rate set point (POLY1SP1). Controller 100 also ceases providing other additives to system 10, thereby providing an initial baseline of additives from which to progress. Additionally, controller 100 stores the flow rate settings for each additive in a storage register, shown in FIG. 4A as COAGFLOW-RATE and POLY1FLOWRATE respectively. Additionally, the turbidity reading is stored in a separate register, NTUtest that indicates a baseline turbidity level for the jar test. These storage registers will only be written over when the jar test process encounters a better turbidity reading as the test progresses, which will be detailed further below.

Controller 100 next increments the flow rate set point of polymer #1 by the amount POLY1INC as set by an operator through interface 120, and stores it in polymer #1 pump flow rate register POLY1SP (Step 408). Controller 100 next tests the turbidity again to determine the result of the additional polymer #1 additive. If the turbidity reading NTU is less than the baseline turbidity reading NTUtest minus a threshold turbidity reduction NTUthreshold, then the new polymer #1 flow rate is stored in POLY1FLOWRATE, the new turbidity reading is stored in NTUtest as a baseline, and the process continues. Note that in the embodiment of the invention where two turbidity meters 160 are employed, during the jar test process the turbidity meter 160 proximate floc tubes 60 is monitored, thereby providing a more immediate indication of the efficacy of the additives on wastewater stream 1, than would the turbidity meter 160 at the exit of dissolved air filtration tank 30.

Next controller 100 checks to determine whether the maximum polymer #1 flow rate has been reached by comparing POLY1SPMAX (the maximum polymer #1 flow rate) to POLY1SP (the current polymer #1 flow rate. If the maximum polymer #1 flow rate has not been reached, controller 100 returns to step 408, again incrementing polymer #1 setpoint and re-checking turbidity. This process continues until polymer #1 reaches its maximum setpoint at step 414, whereupon the combination of polymer #1 and coagulant additives are checked together, as set forth in FIG. 4B.

In step 416, polymer #1 is provided at its initial flow rate set point POLYSP1, and the coagulant flow rate set point (COAGSP) is incremented through each successive iteration by COAGINC (step 418) and once again turbidity NTU is read to determine whether has improved greater than a threshold amount NTUthreshold. (Step 420). If turbidity has improved sufficiently, the current coagulant set point COAGSP is store din COAGFLOWRATE, the current polymer #1 set point POLY1SP is stored in POLY1FLOWRATE, and the reduced turbidity reading NTU is stored in NTUtest, as seen in step 422. If the turbidity has not improved, controller 100 returns to step 418, once again incrementing the coagulant flow rate set point. As can be readily seen from this process, only the flow rate set points that produce the lowest (best) turbidity readings are stored in the FLOW-RATE registers, thus saving the additive flow rate settings that produce the lowest turbidity.

As seen in step 424, if the coagulant flow rate has not reached its maximum set point COAGMAX, then the process returns to step 418, whereupon the coagulant flow rate set point is once again incremented by COAGINC, and the turbidity is retested. If the coagulant flow rate set point COAGSP has reached it's maximum, then several conditions must occur, as shown in steps 426 and 428. Initially, the coagulant flow rate set point COAGSP is reset to its initial rate, COAGSP1. Next, the polymer #1 flow rate set point (POLY1SP) is incremented by POLY1INC, and, as long as the polymer #1 flow rate set point (POLY1SP) has not exceed its maximum POLY1MAX, the process returns to step 418 such that each coagulant flow rate set point is combined with each polymer #1 flow rate set point, and turbidity is checked in each case. As before, where turbidity NTU has improved over a threshold amount NTUthreshold, coagulant flow rate set point (COAGSP) and polymer #1 set point (POLY1SP) are both stored in their respective flow rate registers COAGFLOWRATE and POLY1FLOWRATE to indicate the best combination of additives. As seen in step 428, where the polymer #1 flow rate set point reaches its maximum (POLY1MAX) the test proceeds to its final process steps as detailed in FIG. 4C.

Finally, the polymer #2 additive is tested in conjunction with coagulant and polymer #1 to determine which additive combination produces the lowest turbidity system 10. As seen in step 430 coagulant and polymer #1 are provided at their previously determined optimal flow rate set points, COAGFLOWRATE and POLY1FLOWRATE respectively. Next, in step 432 polymer #2 is provided at its initial flow rate set point POLY2SP and turbidity is again retested (step 434). If the result of the test is a better turbidity reading (minus the turbidity threshold NTUthreshold) then the polymer #2 flow rate set point is stored in POLY2FLOWRATE and the turbidity reading NTU is stored in NTUtest as shown in step 436. If the turbidity reading is not better than NTUtest, the polymer #2 flow rate set point POLY2SP is incremented by POLY2INC as shown in step 440, and the turbidity test is repeated. In this fashion, each flow rate set point of polymer #2 is tested with the best combination of coagulant and polymer #1 to find the optimal combination of additives to produce the lowest turbidity levels.

As best seen in step 438, once the polymer #2 flow rate set point reaches its maximum, POLY2SPMAX, each additive pump is set to the flow rate set point that produced the best turbidity readings throughout the test. Accordingly, coagulant is set to COAGFLOWRATE, polymer #1 is set to POLY1FLOWRATE and polymer #2 is set to POLY2FLOWRATE. At this point, the jar test is complete, step 444. System 10 once again runs normally, awaiting the initiation of a new jar test under the conditions set forth in step 401. Once the jar test is complete, the turbidity meter at the exit of the DAF tank 30 is monitored for turbidity levels that would trigger automatic initiation of ajar test.

The jar test process described above can be repeated for as many additives as necessary for a given wastewater treatment system 10 application. In the system 10 depicted in FIG. 2, the jar test process may also include first and second pH pumps 220 as desired. In this embodiment of the invention, once optimal coagulant and polymer #1 and polymer #2 flow rate set points are found, each pH pump is tested through an operator selectable number of increments to determine optimal pH flow rates. In this fashion, system 10 permits a series of programmable and configurable jar tests to be conducted without the need for actual withdrawal of fluid from the system or for the necessity of having an operator perform multiple turbidity tests and flow rate calculations. Alternatively, the operation of the pH pumps may be controlled by operation of a controller 100 output 112 to provide an effluent 2 pH within a predetermined range independently of the operation of the coagulant 200 and polymer 210 pumps. It should be noted that in some applications it may be necessary to determine proper pH adjustment during the jar test procedure 400. In these applications pH may be tested in conjunction with the optimal additives as determined by jar test 400. Furthermore, in an analogous fashion to the coagulant and polymer additives, a user may specify maximum and minimum pH additive flow rates, as well as flow rate increments at which to test pH.

In an alternative embodiment of the present invention where a first and second turbidity meter 162 are used as shown in FIG. 2, controller 100 utilizes the turbidity reading from the turbidity meter 160 disposed proximate effluent 2 to initiate jar tests but utilizes the turbidity reading from the turbidity meter 160 disposed between floc tubes 60 and tank 30 to conduct jar test. This embodiment of the invention provides a much quicker turbidity feedback than utilizing a single turbidity meter 160.

In accordance with one embodiment of the present invention, turbidity meter 160 may be replaced by a total suspended solids sensor 160 provided in fluid communication with effluent outlet 50 for measuring the clarity of treated wastewater effluent. Total suspended solids sensor 160 comprises an output 162 representative of total suspended solids as measured by any one of several methods, typically provided as a weight per unit volume or parts per million. Output 162 is operatively coupled to an input 110 of controller 100. In this embodiment of the invention, system 10 and the method of treating a wastewater stream 1 to produce an effluent stream 2 having a contaminant concentration below a predetermined threshold operates in the same fashion as discussed herein above utilizing turbidity as a variable, except total suspended solids is the control variable of system 10. For example, an operator sets a maximum ttal suspended solids level (TSSmax) that, when detected by suspended solids sensor 160, will initiate a jar test after time period (T1)

In this embodiment of the invention, total suspended solids (TSS) are continuously monitored rather than turbidity, either by a single TSS sensor 160 in the effluent stream 2 as shown in FIG. 1, or alternatively by a pair of TSS meters 160, one in the effluent stream 2 and one disposed between floc tubes 60 and tank 30. Initially, controller 100 is supplied with a predetermined TSS threshold, TSS max, which is input through operator interface 120. When the total suspended solids as measured by sensor 160 proximate effluent stream 2 exceeds TSS max for a predetermined time period T1, the jar testing process is initiated, as shown in step 401. Both TSS max and T1 may be adjusted by an operator, by inputting appropriate values through use of operator interface 120. Accordingly, the system 10 and method of the invention provides a wastewater treatment system that may be controlled by any desired control variable required to be monitored to treat a particular effluent stream 2.

In a yet further non-limiting embodiment of the invention, biological oxygen demand (BOD) sensors, chemical oxygen demand (COD) sensors, and conductivity meters may be utilized in place of turbidity or TSS sensor 160 to provide the ability to control system 10 using a plurality of input variable suited to the treatment demands of any given effluent stream 2. In this embodiment of the invention, the operator may still input a maximum acceptable threshold for each control variable in an analogous fashion to that discussed herein above utilizing turbidity or total suspended solids as control variables.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

We claim:

1. A system for treating a wastewater stream to produce an effluent stream comprising:
   a plurality of pumps for supplying a plurality of chemical additives at variable flow rates to said wastewater stream at a plurality of points;
   a plurality of flocculant tubes through which said wastewater stream is passed, wherein said chemical additives are supplied to said system in said flocculant tubes;
   a first total suspended solids sensor disposed in said wastewater stream downstream of said chemical additives for monitoring the clarity of said wastewater stream;
   a second total suspended solids sensor disposed in said effluent stream for monitoring the clarity of said effluent, said second total suspended solids sensor having an output sensor representative of effluent clarity; and
   a controller for monitoring said flow rate of said wastewater and varying the flow rates of said chemical additives proportionally, said controller having an input operatively coupled to the output of said second total suspended solids sensor, whereby said output exceeding a predetermined threshold causes said controller to initiate a jar test.

2. A system for treating a wastewater stream to produce an effluent stream as claimed in claim 1 wherein said plurality of pumps comprises:
   a coagulant pump having a variable flow rate for delivering a coagulant to said wastewater stream; and
   at least one polymer pump having a variable flow rate for delivering a polymer to said wastewater stream.

3. A system for treating a wastewater stream to produce an effluent stream as claimed in claim 1 comprising:
   an output from said first total suspended solids sensor operatively coupled to an input of said controller, whereby said output is representative of total suspended solids of a treated wastewater stream.

4. A system for treating a wastewater stream to produce an effluent stream as claimed in claim 1 comprising:
   a plurality of points of chemical injection through which said wastewater stream is passed, wherein said chemical additives are supplied to said system through said points of chemical injection.

5. A system for treating a wastewater stream as claimed in claim 1 wherein said first total suspended solids sensor is disposed downstream of said flocculant tubes.

6. A system for treating a wastewater stream to produce an effluent stream as claimed in claim 1 comprising:
   at least one pH meter in fluid communication with said wastewater stream having an output representative of the pH of said wastewater stream operatively coupled to said controller; and
   at least one pH additive delivery pump for supplying an acidic or alkaline solution to said wastewater stream responsive to said pH meter.

* * * * *